(12) United States Patent  
Brueggen

(10) Patent No.: US 6,968,440 B2
(45) Date of Patent: Nov. 22, 2005

(54) SYSTEMS AND METHODS FOR PROCESSOR MEMORY ALLOCATION

(75) Inventor: Christopher M. Brueggen, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 10/434,679

(22) Filed: May 9, 2003

(65) Prior Publication Data

US 2004/0225858 A1 Nov. 11, 2004

(51) Int. Cl.[7] .............................................. G06F 12/00

(52) U.S. Cl. ........................... 711/171; 711/173; 711/5; 711/206

(58) Field of Search ............................ 711/1, 2, 5, 206, 711/207, 171, 172, 173

(56) References Cited

U.S. PATENT DOCUMENTS

| | | | |
|---|---|---|---|
| 6,131,150 A | 10/2000 | DeTreville | |
| 6,401,184 B1 | 6/2002 | Bouraoui et al. | |
| 6,553,449 B1 * | 4/2003 | Dodd et al. | 711/5 |
| 2003/0023825 A1 * | 1/2003 | Woo et al. | 711/170 |
| 2004/0098537 A1 | 5/2004 | Serizawa | |

FOREIGN PATENT DOCUMENTS

EP 0 519 694 12/1992

OTHER PUBLICATIONS

Fong, "Dynamic Memory Allocation/Deallocation Behavior in Java Programs", © 2002 IEEE, p. 314-317.*
Wuytack, "Minimizing the Required Memory Bandwidth with VLSI System Realizations", © 1999 IEEE, p. 433-441.*
Bays, "A Comparison of Next-fit, First-fit, and Best-fit", © 1977 ACM, p. 191-192.*
Wang, "Managing Small Memory Blocks in Malloc()", Jun. 1999, p. 1-3.*
"Address Mapping for a Memory System With a Prime Number of Banks," IBM Technical Disclosure Bulletin, Apr. 1985, pp. 1&2.
Foreign Search Report issued for GB0409009.8, dated Aug. 20, 2004.

* cited by examiner

Primary Examiner—Brian R. Peugh

(57) ABSTRACT

In one embodiment, there is disclosed a system and method for mapping memory addresses to system memory by establishing the size and location of each memory rank within the system memory, establishing a total size of said system memory, and fitting each said memory rank into the system memory block by using a highest power of 2 fitting rule for each iteration such that each highest power of 2 for each iteration controls the allocation of memory ranks for each such iteration.

20 Claims, 5 Drawing Sheets

FIG. 2A

```
MEMORY POSITION
 0  1  2  3 | 4  5  6  7 | 8  9 10 11 |12 13 14 15 |16 17 18 19 |20 21 22 23 |24 25 26 27 |28 29 30 31

RANKS INSTALLED:
 1  1  1  1   1  1  1  1   0  0  0  0   0  0  0  0   1  1  0  0   1  1  0  0   0  0  0  0   0  0  0  0

EXAMPLE 1 (NON-OPTIMAL):

RANKS ASSIGNED TO INTERLEAVE GROUP 0:
 1  1  1  1   1  1  1  1   0  0  0  0   0  0  0  0   0  0  0  0   0  0  0  0   0  0  0  0   0  0  0  0

RANKS ASSIGNED TO INTERLEAVE GROUP 1:
 0  0  0  0   0  0  0  0   0  0  0  0   0  0  0  0   1  1  0  0   1  1  0  0   0  0  0  0   0  0  0  0

EXAMPLE 2 (OPTIMIZED):

RANKS ASSIGNED TO INTERLEAVE GROUP 0:
 0  1  0  1   0  1  1  1   0  0  0  0   0  0  0  0   1  0  0  0   1  0  0  0   0  0  0  0   0  0  0  0

RANKS ASSIGNED TO INTERLEAVE GROUP 1:
 1  0  1  0   1  0  0  0   0  0  0  0   0  0  0  0   0  1  0  0   0  1  0  0   0  0  0  0   0  0  0  0
```

FIG. 2B

| 2GB | 1GB | 1GB |
|-----|-----|-----|
| 0   |     |     |
| 2   | 1   |     |
|     |     | 3   |
| 4   |     |     |
| 6   | 5   |     |
|     |     | 7   |

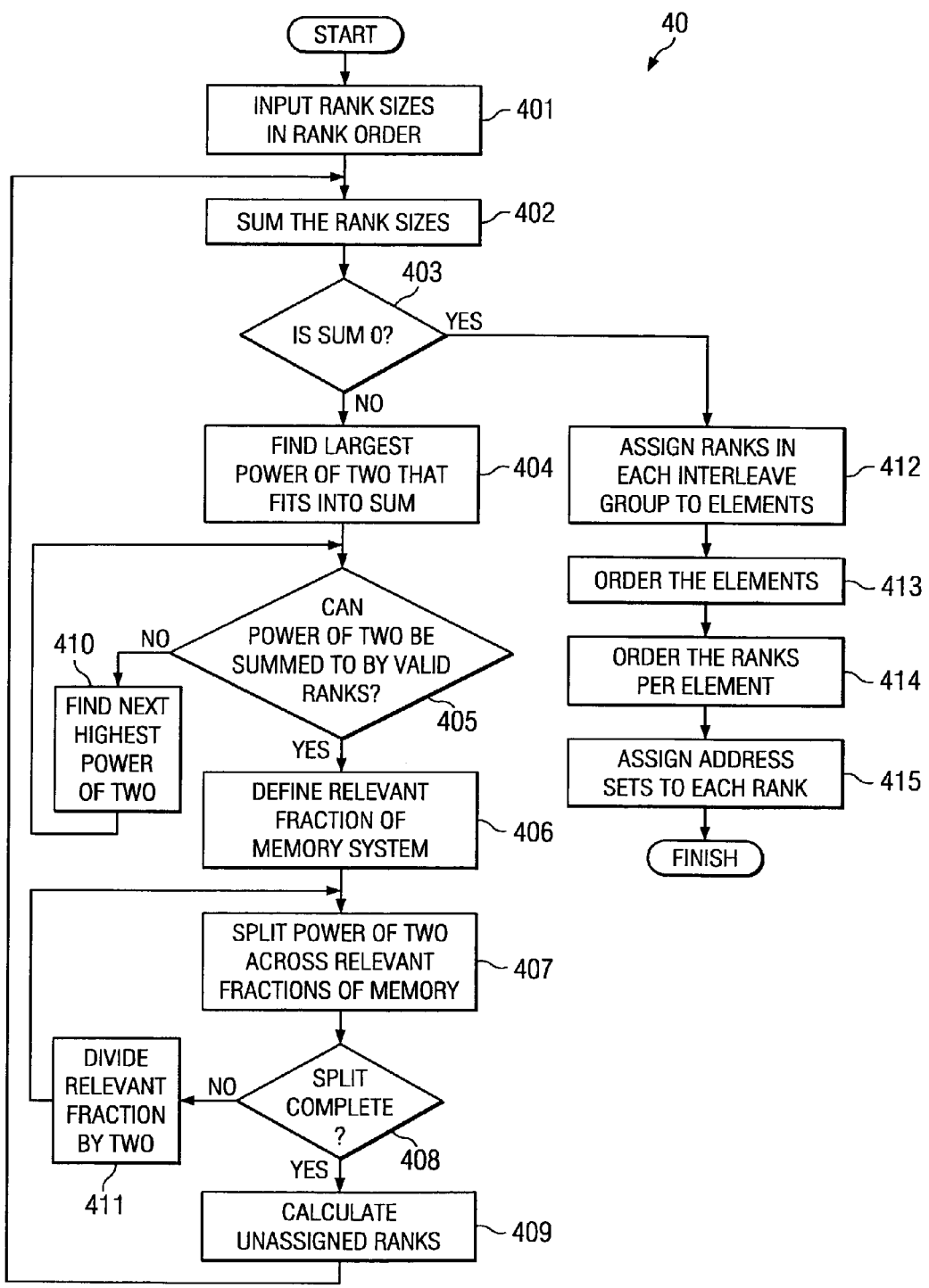

SYSTEMS AND METHODS FOR PROCESSOR MEMORY ALLOCATION

BACKGROUND

Memory systems may have memory installed on multiple memory buses attached to the memory chip. A memory rank is a logical unit of installable memory that may comprise of one or more Dual In-line Memory Modules (DIMMs). A high performance memory system is designed with ranks of memory installed on multiple independent buses. This arrangement increases the bandwidth (input/output capacity) because multiple ranks can be accessed simultaneously on independent buses.

One memory system comprises a memory interface that is split into mirror images, referred to as halves. In each mirror image half there is coherency logic that, in turn, controls two memory quadrants. For each quadrant (four in all) there is a scheduler that handles timing and which also controls the reads and writes. Each memory quadrant contains a memory buffer device (which may consist of multiple ASICs) that is accessed via a single high speed bus. The memory buffer device interfaces to two independent DRAM buses on which the ranks are installed. In the scheduler for each quadrant, there is a Memory Block Address Translation (MBAT) module, which translates addresses into the format used by the scheduler. As a set, the four MBAT modules define the quadrant, DRAM bus, and rank that a given address maps to, as well as supplying the bank, row, and column addresses recognized by the DRAM rank. Since installed ranks can consist of DIMMs constructed with DRAM parts of different densities, a rank can represent a variable amount of memory. When it is desired to install different size DIMMs in a system, a problem exists with mapping them into the address space so that there are no holes (ranges of unmapped addresses), and so that the logic supports the mapping of a set of addresses to a specified rank.

In order to optimize bandwidth, it is desired to map a set of addresses to each rank so that consecutive addresses map to ranks on different quadrants and DRAM buses. Prior to doing this, the ranks must be organized into groups (referred to as interleave groups) so that a range of addresses will map to an interleave group, with a set of addresses in the range mapping to each rank in the interleave group. For example, assume a range of addresses starting at address 0 are mapped to an interleave group. One of the ranks in that group represents ¼ of the memory in the group. The MBAT registers that correspond to that rank will be programmed such that every fourth address maps to that rank, starting with address 0, 1, 2, or 3. If the first address in the set is 0, the set will be (0,4,8, . . . ). If the first address is 1, the set will be (1,5,9, . . . ), etc. The address translation logic in the MBAT requires that the range of addresses that are mapped to an interleave group begins with an address on a power of 2 boundary that is a multiple of the size of the interleave group. It also requires that the set of addresses that map to each rank in the interleave group is constructed such that the difference between each pair of consecutive addresses in the set is the same, and is a power of two. In the previous example, it would not be possible to map the following set of addresses to the rank: (0,1,8,9,16,17, . . . ).

A problem exists with constructing a set of addresses for each rank such that all addresses in the range are mapped, and each address is mapped to a single rank. For example, assume an interleave group composed of three ranks that represent 1 gigabyte, 1 gigabyte, and 2 gigabytes of memory respectively. Suppose that the range of addresses from 0 to 4 gigabytes (0xffffffff) are mapped to the interleave group. Next suppose the set of addresses (0,4,8, . . . ) is mapped to the first 1 gigabyte rank, and the set of addresses (3,7, 11, . . . ) is mapped to the second 1 gigabyte rank. All of the remaining addresses in the range must be mapped to the 2 gigabyte rank: (1,2,5,6, . . . ). This is not possible, because the difference between the first and second addresses in the set is not the same as the difference between the second and third addresses. The solution is to order the ranks in the interleave group from largest to smallest before assigning sets of addresses to each rank. In the previous example, the 2 gigabyte rank would be mapped first, to addresses (0,2, 4, . . . ). One of the remaining 1 gigabyte ranks would be mapped to addresses (1,5,9, . . . ), and the remaining 1 gigabyte rank would be mapped to addresses (3,7,11, . . . ).

The problem of organizing ranks into interleave groups, and mapping a set of addresses to each rank, becomes more complicated as the number and size of possible ranks increases. For example, in a system having 32 ranks and perhaps six different possible memory sizes for each rank, there are numerous ways to organize the ranks into interleave groups and assign sets of addresses to each rank. A trial and error approach is time consuming and may not yield a result that optimizes bandwidth. A general method is desired which will work for any arbitrary number of ranks of varying sizes.

A prior art solution for grouping memories into interleaved groups and mapping them onto the address space was to specify a rule that only ranks of the same size could be placed in an interleave group. Then the interleave groups would be ordered according to the size of the memory they represented, with the largest interleave group being mapped to an address range starting with 0, the next largest interleave group being mapped to an address range starting where the first address range ended, and so on. In the example discussed above, there are ranks of two different sizes (1 and 2 gigabytes). Using the prior art solution, two interleave groups would be formed, one of them would contain the 2 gigabyte rank, and the other would contain the 1 gigabyte ranks. This configuration may result in non-optimal bandwidth because a set of consecutive addresses (0,1,2, . . . ) would be mapped to a single rank of 2 gigabytes instead of those consecutive addresses mapping to multiple ranks.

Another problem not formally addressed by the prior art solution is the assignment of ranks to an interleave group when there is a choice between two ranks of the same size, where one will be assigned to the interleave group, and the other will not. Assume that 6 ranks are installed in a system, each one representing 1 gigabyte of memory. Since an interleave group must be a power of two in size, two interleave groups will have to be formed. Four of the available ranks must be assigned to one of the interleave groups, and the remaining two ranks to the other. The assignment of the ranks may affect bandwidth. For example if four of the ranks are on a single DRAM bus, it would not be optimal to assign those four ranks to a single interleave group, because that would cause a large number of consecutive addresses to be directed to a single DRAM bus.

SUMMARY

In one embodiment, there is disclosed a system and method for mapping memory addresses to system memory comprising establishing the size and location of each memory rank within the system memory, establishing a total size of the system memory, and fitting each said memory rank into the system memory block by using a highest power of 2 fitting rule for each iteration such that each highest power of 2 for each iteration controls the allocation of memory ranks for each such iteration.

BRIEF DESCRIPTION OF THE DRAWINGS

FIG. 2A illustrates two examples of assigning ranks to interleave groups of a memory;

FIG. 2B illustrates an example of interleaving addresses across multiple ranks in an interleave group;

FIGS. 3A and 3B show the operational aspects of one embodiment; and

FIG. 4 is a flow chart illustrating one embodiment.

DETAILED DESCRIPTION

Figure 1:
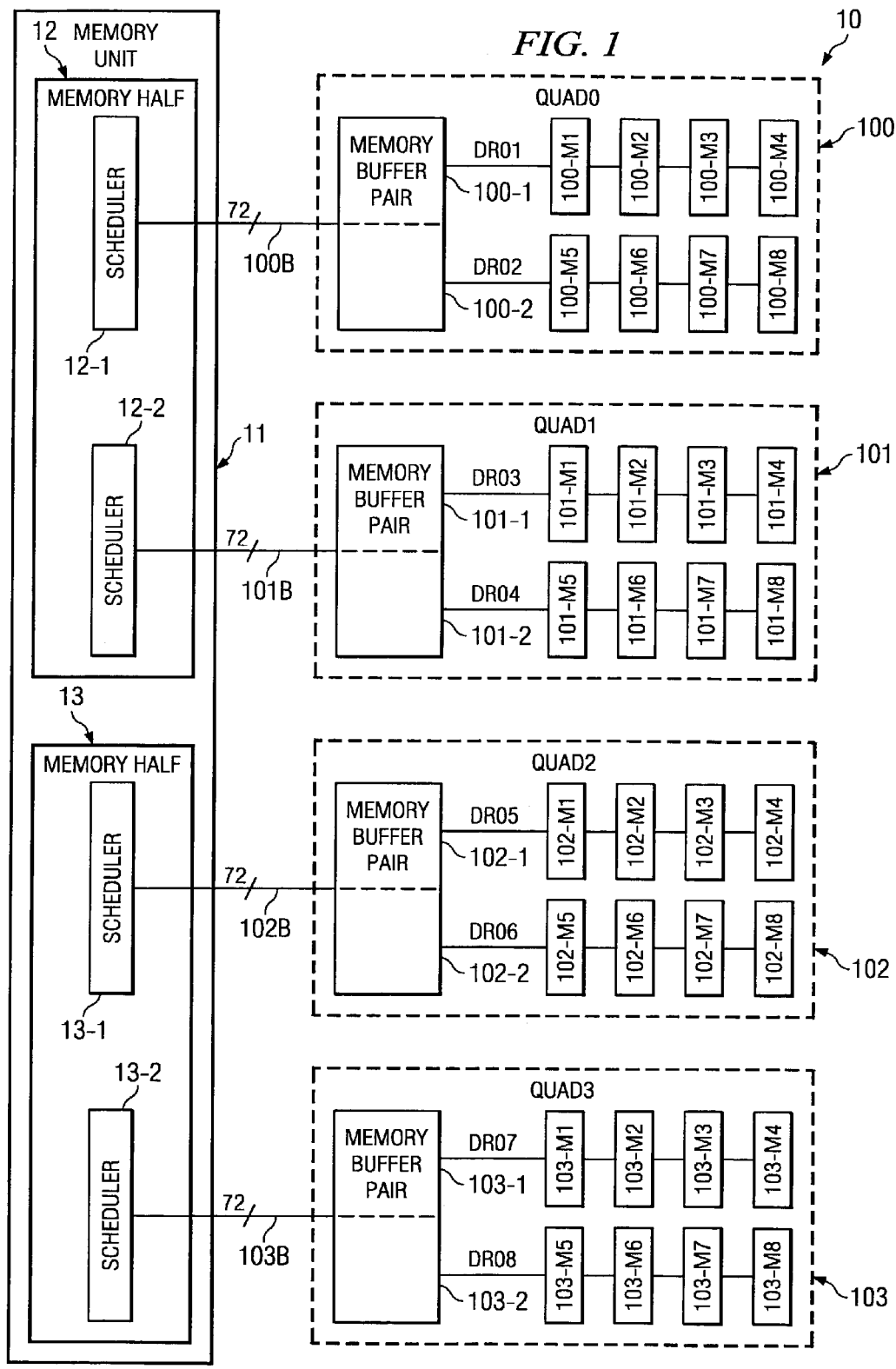
FIG. 1 is a block diagram of one embodiment of a memory system organized in a manner discussed herein.

FIG. 1 shows one embodiment where memory system 10 has four quadrants 100, 101, 102, 103. Each quadrant is attached to memory unit (MU) 11 by a high speed 72-bit bus, 100B, 101B, 102B, 103B. Each bus attaches MU 11 to a pair of memory buffer circuits 100-1, 100-2, 101-1, 101-2, 102-1, 102-2, 103-1, 103-2 which, in turn, connect to ranks installed on two independent DRAM buses—ranks 100M1–100M4 & 100M5–100M8, 101M1–101M4 & 101M5–101M8, 102M1–102M4 & 102M5–102M8, 103M1–103M4 & 103M5–103M8. MU 11 of the illustrated embodiment includes memory halves 12 and 13, each including schedulers 12-1 and 12-2, and 13-1 and 13-2, respectively.

The memory buffer circuits are designed in pairs and work in parallel, and, as discussed, are attached to MU 11 over the high speed buses and interface directly to the memory buses. This arrangement allows for a single MU to attach to more memory than it otherwise could because of the limited number of pins on the device containing the MU. The embodiment shown has eight DRAM buses, DR01 through DR08, all independent of each other. This arrangement is for illustration only and the systems and methods discussed herein are not limited to the configuration shown.

In the embodiment shown in FIG. 1, there are four ranks per DRAM bus, each rank consisting of a pair of DIMMs. A rank is the smallest physical unit of memory that can be added or subtracted from the system; however a rank can represent a variable amount of memory, since a DIMM can represent a variable amount of memory. In the embodiment shown, the MU can support DIMMs that are constructed from DRAMs of sizes 64 megabits up to 2 gigabits. The total amount of memory on a DIMM is the sum of the memory in all of the DRAMs on the DIMM. For convenience, memory is handled as ranks, where the smallest rank supported in the embodiment discussed herein represents ¼ gigabyte, and the largest rank represents 8 gigabytes. In this situation, ¼ gigabyte of memory can be referred to as 1 unit, and 8 gigabytes of memory can be referred to as 32 units. Doing so results in six different rank sizes (1, 2, 4, 8, 16, 32) that can be assigned to any rank location (0–31).

The first part of the problem is to organize ranks into interleave groups such that all the memory in the system is represented by one or more interleave groups, each a power of two in size, and such that ranks are assigned to interleave groups in an optimal way. Each interleave group should be composed of ranks installed on as many quadrants and DRAM buses as possible. This increases the potential for mapping consecutive addresses to different quadrants, buses and ranks. Over any short period of time, a processor tends to make most accesses in a localized region of memory, which will fall within an interleave group. That is the reason for optimizing the bandwidth of each interleave group by composing it of ranks on separate quadrants and DRAM buses.

FIG. 2A illustrates this concept where a memory having 32 positions (0–31) is shown. There are 12 ranks (positions, 0–7, 15, 16, 19, 20) of memory of size 1 unit installed. The first four rank positions (0–3) represent ranks on quadrant 0, DRAM bus 0. The next four rank positions (4–7) represent ranks on quadrant 0, DRAM bus 1. The next four (8–11) represent ranks on quadrant 1, DRAM bus 0, etc. A total of 12 units of memory are installed, so it will have to be assigned to two, interleave groups, one of size 8 units, and one of size 4 units.

In example 1, the 8 ranks of memory on quadrant 0 are assigned to interleave group 0, and the remaining ranks are assigned to interleave group 1. This is non-optimal, because all accesses to memory in interleave group 0 take place over a single MID bus (the high speed bus connecting the MU to quadrant 0). Furthermore, the accesses take place across one or the other of only two DRAM buses. Accesses to a series of consecutive addresses in interleave group 0 will be constrained by the bandwidth of the quadrant bus and the two DRAM buses. Similarly accesses to interleave group 1 will be constrained by the bandwidth of one quadrant bus and two DRAM buses.

In example 2, the assignment of ranks to interleave groups has been done according to the method discussed here. The ranks in positions 1, 3, 5, 6, 7, 17, 20, and 21 are assigned to interleave group 0 and the remaining ranks to interleave group 1. The assignment of ranks to interleave groups is optimized, because accesses to interleave group 0 now take place over two quadrant buses and four DRAM buses, and accesses to interleave group 1 now take place over two quadrant buses and three DRAM buses.

FIG. 2B illustrates the second part of the problem where a set of addresses is assigned to each rank in an interleave group. FIG. 2B shows a table having the 2 gigabyte memory rank in the left most column, and one of the 1 gigabyte ranks in the middle column, and the second 1 gigabyte rank in the third column. Using cache line addresses zero to seven, a preferred ordering would provide for address "zero" accessing the 2 gigabyte rank, then address "one" accessing the 1 gigabyte rank in the center column. Then cache line address "two" would return to the 2 gigabyte rank, and then address "three" would access the remaining 1 gigabyte rank (far right). It would continue on; address "four" would access the 2 gigabyte memory and address "five" would access the 1 gigabyte memory. Address "six" would access the 2 gigabyte memory and address "seven" would access the 1 gigabyte memory.

Thus, for cache line addresses "zero" through "seven", the mapping sets up so addresses "zero", "two", "four", and "six" would access the 2 gigabyte rank, while addresses "one" and "five" would access the center 1 gigabyte rank, and addresses "three" and "seven" would access the other 1 gigabyte rank. Continuing in this fashion, the system would map twice as much memory to the 2 gigabyte rank as to each of the 1 gigabyte ranks. If the memory is accessed at consecutive cache line addresses, it would skip across these ranks, which, as discussed previously, increases the bandwidth.

The example just discussed is relatively simple. When there is large memory capacity and when it is desired to allow memory ranks of any size to be physically installed (or removed) in any rank position, complications exist. For example, let us assume a system having 32 ranks, numbered 0–31. Let us assume that the smallest rank size that is supported in a particular system is ¼ gigabyte, and the largest is 8 gigabytes. We can assign ¼ gigabyte of memory as a unit of 1 and an 8 gigabyte memory as a unit of 32. Doing so yields six different rank sizes (1, 2, 4, 8, 16, 32) that can be assigned to any rank location 0–31. This leads to a convenient method for representing the memory installed in the system, as a string of 32 numbers, each one representing the rank size that is installed in the rank location specified by the ordinate position in the string. A zero indicates that there is no rank installed in that location, and a 2 indicates that a rank of size 2 (½ GB) is installed in that location. A 32 indicates that a rank of size 32 (8 GB) is installed in that location and so forth.

Figure 3A:
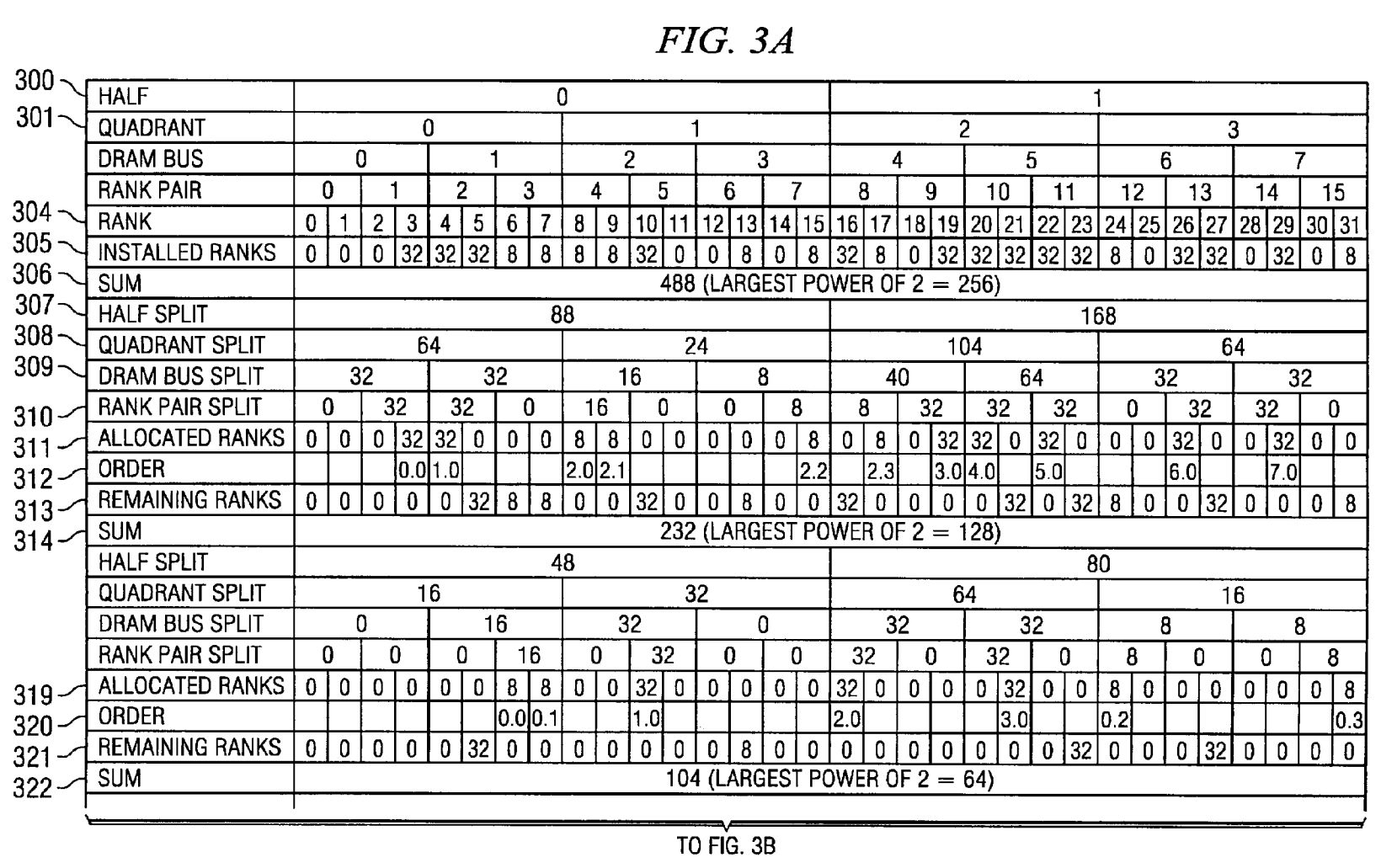
Figure 3B:
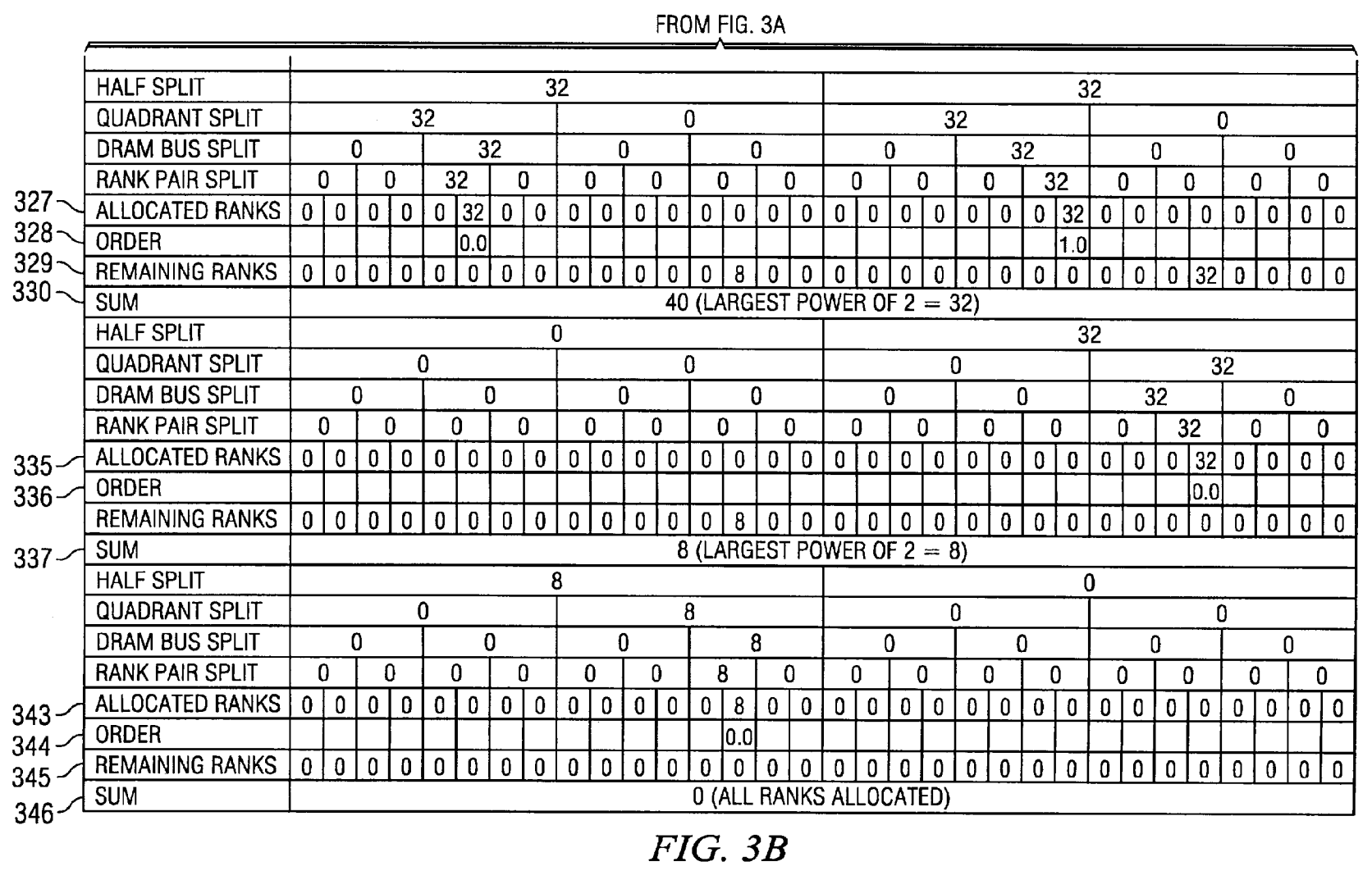

FIGS. 3A and 3B show a memory system having 32 rank locations (line 304) numbered 0–31. The number in line 305 below each rank represents the size of the memory (0, 2, 4, 8, 16, 32) installed at that location. The first step is to add these numbers together. In the example shown, the sum is 488, as shown on line 306. That sum (488) is split into powers of two which will be the sizes of the interleaved groups ranks are assigned to. The largest power of 2 that will fit into 488 is 256, as shown on line 306.

The ratio of the sum of the ranks in locations 0–15 (lower ½ as shown on line 300) to the sum of the ranks in locations 16–31 (upper ½ as shown on line 300) is 176/312 (~0.564). The interleave group of size 256 is composed of ranks in the two memory halves such that the ratio of the sum of assigned ranks in locations 0–15 to the sum of assigned ranks in location 16–31 is as close as possible to 176/312. The split is shown on line 307, with 88 units allocated to one memory half and 168 units allocated to the other half. The process is repeated to split 88 across quadrants 0 and 1 (identified in line 301), and 168 across quadrants 2 and 3 (also identified in line 301) as shown in line 308. 88 is split into 64 and 24 across quadrants 0 and 1 while 168 is split into 104 and 64 across quadrants 2 and 3. Again, the process is repeated to split the assigned memory per quadrant across DRAM buses as shown in line 309, and again to split the assigned memory per DRAM bus across rank pairs, as shown in line 310. Finally the assigned memory is split across ranks as shown in line 311. Line 311 shows the allocation of ranks to interleave group 0, with their sum being 256. Line 313 shows the memory remaining to be allocated, which sums to 232.

Line 314 shows 128 as the largest power of 2 to fit 232. Similar to the previous step, an interleave group of size 128 is composed of the available ranks, attempting to match the ratio of memory assigned from each half, quadrant, DRAM bus, and rank pair, as closely as possible to the ratio of available memory in each half, quadrant, DRAM bus, and rank pair.

Line 319 shows the allocated ranks in this second iteration, while line 321 shows the remaining ranks which sum to 104. Again, the allocated memory (line 319) is subtracted from the last remaining memory (line 313) to yield a new remaining memory (line 321).

Line 322 shows 64 as the largest power of 2 of sum 104. Line 327 shows ranks 5 and 23 matching the 32—32 split. Line 327 shows the third iteration allocation and line 329 shows the remaining ranks, totaling 40.

Line 330 shows that the largest power of 2 is 32 which fits in rank 27 on line 335. Line 335 shows the fourth iteration rank allocation and line 337 shows the remaining ranks, totaling 8. The largest power of 2 is 8, shown on line 337. Line 343 shows the assignment of 8 to rank 13. Line 343 shows the allocated ranks and line 345 shows the remaining ranks totaling 0 (line 346). All of the installed ranks have now been assigned to interleave groups. The interleave groups will be ordered from largest to smallest and address ranges will be mapped to the interleave groups in that order. The interleave group of size 256 (line 312) will be mapped to an address range starting at 0 and extending to the largest address necessary to map 64 gigabytes (0x0f_ffff_ffff). The interleave group of size 128 (line 320) will be mapped to an address range starting at the next available address (0x10_0000_0000) and extending to the largest address necessary to map 32 gigabytes (0x17_ffff_ffff). Address ranges will be mapped to the remaining interleave groups in the same fashion.

For a random memory installation it may be that there is more memory installed in one half than another, or more in one quadrant than another. As memory is assigned to interleave groups, the systems and methods discussed above attempt to weight the assignment so that the ratio of memory in each half, quadrant, DRAM bus, and rank pair assigned to each interleave group is as close as possible to the ratio of memory in each half, quadrant, DRAM bus, and rank pair that is available. This optimizes bandwidth by increasing the average bandwidth available for accesses to a given interleave group, as discussed above.

Because of limitations in address decoding logic, it is desirable to ensure that no ranks are assigned to an interleave group which have a size less than 1/32 the size of the interleave group. In the method of mapping ranks to interleave groups described above, each rank should be verified to be sure it is greater than or equal to 1/32 of the interleave group size. If it is not possible to find ranks that sum up to the desired interleave group size without one or more of them being less than 1/32 the size of the group, then embodiment of the system and method repeat, beginning at line 307, with the next smallest power of 2 (128). The method then reiterates lines 308–346 until all ranks are allocated.

FIG. 4 shows flow chart 40 where, in process 401, rank sizes are input in rank order. Process 402 sums the ranks. If the sum is zero, all ranks have been assigned to interleave groups, so process 403 initiates process 412. If the sum is not zero, process 404 continues by finding the largest power of two that will fit into the sum of rank sizes. In process 405, it is determined if that power of two can be summed to with valid ranks. Non-valid ranks are those of size less than 1/32 of the power of two. If NO, process 410 determines the next largest power of two and returns to process 405. If YES, process 406 defines the relevant fraction of the memory system to split the power of two across as ½. Process 407 splits the power of across the relevant fractions of the memory system in a ratio as close as possible to the ratio of the sums of rank sizes installed in each fraction. Note that this is an iterative process that verifies that the units assigned to each fraction can actually be summed to by the rank sizes in the fraction. Process 408 determines if the split is complete, i.e. individual ranks have been assigned to the interleave group. If NO, the relevant fraction of the memory system to perform a split across is redefined by dividing the previous relevant fraction by 2 (e.g. the units assigned per half are further split across quadrants) in process 411, and process 407 repeats. If YES, all remaining unassigned ranks are determined in process 409, and the flow returns to process 402. If the output of process 403 is yes, the flow continues to process 412, which is the first step in assigning an address set to each rank.

The assignment of address sets to ranks was previously discussed above, with a trivial example. The method for assigning address sets according to embodiments may be described as follows. In the first step (process 412), all the ranks in each interleave group are further assigned to interleave group elements of equal size. The element size is equal to the largest rank size, and the largest rank will be assigned to its own element. Remaining elements will be composed of one or more ranks whose sizes sum to the element size. Further discussion of the operation of processes 412–415 with respect to one embodiment is provided below.

Referring again to FIGS. 3A and 3B, line 311, the largest rank size in interleave group 0 is 32. The element size according to an embodiment will be 32. Elements are assigned ordinates, and ranks are assigned to elements from left to right in the row, passing over any ranks that will not fit into the remaining space in the element according to the illustrated embodiment. In FIGS. 3A and 3B, line 311, element 0 will comprise the rank of size 32 in location 3. Element 1 will comprise the rank of size 32 in location 4. Element 2 will comprise the ranks in locations 8, 9, 15, and 17, and so on. The number of elements according to the illustrated embodiment will always be a power of two, since the interleave group size is a power of two, and the element size is a power of 2. The ranks in line 311 are assigned to 8 elements, 0–7.

Next, the elements may be ordered in a list as follows. If there are 4 elements, the order will be (0,2,1,3). For 8 elements, the order will be (0,4,2,6,1,5,3,7). For 16 elements, the order will be (0,8,4,12,2,10,6,14,1,9,5,13,3,11,7,15), and so on. The method for ordering an arbitrary (power of two) number of elements is to make element 0 the first in the list, followed by the element with ordinate that corresponds to ½ the number of elements, followed by the element that corresponds to ¼ the number of elements, followed by the element that corresponds to ¾ the number of elements, and so on. The simplest way to perform this method in software is to order the element ordinates as binary values. For example, with 16 elements, each element ordinate has a 4-bit binary value: $0=0000_2$; $1=0001_2$; and so on. When ordering the elements, the index of each element in the ordered list is found by reversing the bits of the binary ordinate value. For example, reversing $0000_2$ results in $0000_2$, so element 0 will be at index 0 in the ordered list. Reversing $0001_2$ results in $1000_2$, so element 1 will be at index 8 in the ordered list.

Next, the ranks within an element are ordered from largest to smallest. The order of any ranks of equal size is not of significant importance. Now all the ranks in the system have been ordered, based first on the interleave group, secondly on the element order within the interleave group, and thirdly on the rank order within the element. This ordering is shown on FIGS. 3A and 3B at lines 312, 320, 328, 336, and 344, where 0.0 represents the first rank in element 0; 0.1 represents the second rank in element 0; 1.0 represents the first rank in element 1; and 3.3 represents the fourth rank in element 3.

After the ordering process, address sets are assigned to each rank in the order that has been defined according to the illustrated embodiment. The first address set is assigned to the first rank in interleave group 0, element 0 and so on. The address set assigned to a rank begins with the first unassigned address, and continues with successive addresses spaced so that the total number of addresses assigned to the rank will be correct and the address set will fit within the memory range assigned to the interleave group. Referring to FIGS. 3A and 3B, the first address set would be assigned to the first rank in interleave group 0 (line 308), element 0 (the rank in location 3). The first address in the set will be the first unassigned address (0), and the remaining addresses will be spaced as necessary. The resulting address set will be (0x0,0x8,0x10, . . . , 0x0f_ffff_fff8) making up ⅛ of the addresses mapped to interleave group 0, since the rank size is ⅛ of the interleave group size. The next address set will be assigned to the first rank in element 4 (the rank in location 20). That set will begin with the first unassigned address (1) and continue with every eighth following address: (0x1,0x9, 0x11, . . . , 0x0f_ffff_fff9). The next address set will be assigned to the first rank in element 2 (which has been chosen as the rank in position 8). This set will be (0x2,0x22, 0x42, . . . , 0x0f_ffff_ffe2). The next addresses set will be assigned to the second rank in element 2, and will be (0x3,0x23,0x43, . . . 0x0f_ffff_ffe3). After going through this process for all the ranks in interleave group 0, all of the addresses up to 0x0f_ffff_ffff (64 gigabytes) will have been assigned. Note that this corresponds to the address range mapped to interleave group 0, as discussed above. The process continues with the first rank in the first element of interleave group 1, which will be the rank in position 6. The address set for that rank will start with the first unassigned address (0x10_0000_0000) and continue with every sixteenth address, since the rank size is 1/16 of the interleave group size. The resulting address set will be (0x10_0000_0000,0x11_0000_0010, . . . ,0x17_ffff_fff0). The process is continued until all addresses are assigned to ranks. Note that addresses in each set can be decoded with a simple mask/compare operation on the bits of the binary representation of the address. The address set (0x0,0x8,0x10, . . . ,0x0f_ffff_fff8) is all addresses with bits [39:36] equal to $0000_2$, and bits [2:0] equal to $000_2$. The address set (0x3,0x23,0x43, . . . , 0x0f_ffff _ffe3) is all addresses with bits [39:36] equal to $0000_2$, and bits [4:0] equal to $00011_2$. The address set (0x10_0000_0000, 0x10_0000_0010, . . . ,0x17_ffff_fff0) is all addresses with bits [39:35] equal to $00010_2$, and bits [3:0] equal to $0000_2$.

The assignment of address sets is shown in FIG. 4 beginning with process 412. In process 412, the ranks are assigned to interleave group elements. In process 413, the elements in each interleave group are ordered. In process 414, the ranks in each element are ordered. In process 415, an address set is assigned to each rank, following the rules described in paragraph 0039, then the flow finishes.

Note that while a memory system is discussed having 32 memory devices, the concepts discussed herein could apply to any memory system designed in a hierarchical way, e.g. 4 DRAM buses, 16 DRAM buses, 2 ranks per bus, 8 ranks per bus, etc.

What is claimed is:

1. A method for mapping memory addresses to system memory comprising:
    establishing the size and location of each memory rank within said system memory;
    establishing a total size of said system memory; and
    fitting each said memory rank into said system memory block by using a highest power of 2 fitting rule for each iteration such that each highest power of 2 for each iteration controls the allocation of memory ranks for such iteration.

2. The method of claim 1 further comprising:
    assigning memory locations across said ranks in accordance with the iteration in which said memory rank was fitted.

3. A system for memory block allocation comprising:
  means for establishing the size and location of each memory rank within said memory block;
  means for establishing a total size of said memory block; and
  means for fitting each said memory rank into said memory block by using a highest power of 2 fitting rule for each iteration such that each highest power of 2 for each iteration controls the allocation of memory ranks for such iteration.

4. The system of claim 3 further comprising:
  means for assigning memory locations across said ranks in accordance with the iteration in which said memory rank was fitted; and
  means for assigning physical memory addresses to said assigned segments in iteration order.

5. A method for assigning addresses to a block of memory, said method comprising:
  finding the highest power of two that fits into the size of said memory block;
  splitting said power of two into portions, said portions representing memory sizes;
  assigning each said portion to a segment of said memory block; and
  continuing said splitting and assigning in iteration order until every segment of said memory block has a portion assigned to it, said assigned portion matching exactly the memory size of said assigned memory segment.

6. The method of claim 5 wherein said continuing said splitting and assigning comprises:
  for each iteration, subtracting assigned memory from said memory block to create a new memory block.

7. The method of claim 6 wherein said continuing said splitting and assigning ends when the created new block has a memory size of zero.

8. The method of claim 7 further comprising:
  when said continuing said splitting and assigning ends assigning virtual memory addresses to said assigned segments in iteration order.

9. The method of claim 6 further comprising:
  when the new memory size is greater than zero and no further iterations are possible, finding a next highest power of 2 of the original memory block and repeating said splitting, assigning, and continuing.

10. A system for assigning addresses to a block of memory, said system comprising:
  means for finding the highest power of two that fits into the size of said memory block;
  means for splitting said power of two into portions, said portions representing memory sizes;
  means for assigning each said portion to a segment of said memory block; and
  means for continuing said splitting and assigning in iteration order until every segment of said memory block has a portion assigned to it, said assigned portion matching exactly the memory size of said assigned memory segment.

11. The system of claim 10 wherein said continuing means comprises:
  means operative for each iteration for subtracting assigned memory from said memory block to create a new memory block.

12. The system of claim 11 further including:
  means for inhibiting said splitting and assigning when the created new block has a memory size of zero.

13. The system of claim 12 further comprising:
  means for assigning virtual memory addresses to said assigned segments in iteration order, said means operative when said continuing ends.

14. The system of claim 12 further comprising:
  means operable when a new memory size is greater than zero and no further iterations are possible, finding a next highest power of 2 of the original memory block.

15. A method for assigning physical address locations to a memory array, said memory array having M memory devices accessible via Q quadrants, said method comprising:
  (a) creating a string of numbers having M ordinate positions, each ordinate position containing a number representing the size of the memory in a corresponding memory position;
  (b) summing said string of numbers;
  (c) determining a number N which is the highest power of 2 of said sum;
  (d) summing the first half of said string of numbers and summing said second half of said string of numbers to obtain a ratio there between;
  (e) splitting said number N into two portions in a ratio similar to said obtained ratio;
  (f) assigning each portion to a particular half of said memory in accordance with said ratio;
  (g) iteratively breaking each portion into subportions and matching said subportions with memory sizes spread across quadrants of each said memory half until all subportions are assigned;
  (h) subtracting said assigned memory from said string of numbers such that each ordinate position contains a number representing the size of the memory in any remaining memory positions; and
  (i) repeating steps (b) through (h) until said subtracting step either yields no remaining memory, or no further subtractions are possible and there is memory remaining.

16. The method of claim 15 further comprising:
  the step of assigning virtual addresses sequentially in accordance with the ordinate location in each of said iterative step when said repeating step yields no remaining memory.

17. The method of claim 15 further comprising the steps of:
  when said repeating step yields remaining memory, repeating steps (c) through (j) by selecting a new number N.

18. The method of claim 15 wherein Q is 4 and M is 32 or greater.

19. The method of claim 15 wherein each said memory is accessible by at least two controllers, said controllers forming said quadrants.

20. The method of claim 19 wherein said controllers are connected to a common memory access point by high speed buses.

* * * * *

UNITED STATES PATENT AND TRADEMARK OFFICE
CERTIFICATE OF CORRECTION

PATENT NO. : 6,968,440 B2  Page 1 of 1
APPLICATION NO. : 10/434679
DATED : November 22, 2005
INVENTOR(S) : Christopher M. Brueggen It is certified that error appears in the above-identified patent and that said Letters Patent is hereby corrected as shown below:

In column 3, line 26, delete "I00M5-100M8" and insert -- 100M5-100M8 --, therefor.

In column 8, line 14, delete "addresses" and insert -- address --, therefor.

In column 8, line 27, delete "0x11_0000_0010" and insert -- 0x10_0000_0010 --, therefor.

Signed and Sealed this

Fourth Day of August, 2009

JOHN DOLL
*Acting Director of the United States Patent and Trademark Office*